April 22, 1952 F. H. MATHEY 2,594,191
PIPE-CUTTING APPARATUS
Filed April 21, 1950 5 Sheets-Sheet 1

Frank H. Mathey
ATTORNEY

April 22, 1952 F. H. MATHEY 2,594,191
PIPE-CUTTING APPARATUS
Filed April 21, 1950 5 Sheets-Sheet 3

INVENTOR
Frank H. Mathey
BY
ATTORNEY

Patented Apr. 22, 1952

2,594,191

UNITED STATES PATENT OFFICE 2,594,191

PIPE-CUTTING APPARATUS

Frank H. Mathey, Tulsa, Okla.

Application April 21, 1950, Serial No. 157,281

13 Claims. (Cl. 33—21)

My invention relates to pipe cutting apparatus of the type that cuts the pipe by means of a torch which is moved circumferentially of the pipe.

An important object of the invention is to provide apparatus of the above mentioned character which may be properly and quickly applied to the pipe and which may be manipulated to move the torch completely around the pipe.

Further object of the invention is to provide means to move the torch circumferentially of the pipe and including rack sections which are automatically connected and disconnected from each other.

A further object of the invention is to provide means whereby the torch may be adjusted longitudinally of the pipe after forming the starting hole in the pipe so that the cut end of the pipe may be continuous and free from such starting hole.

Further object of the invention is to provide means whereby the torch may be angularly adjusted to cut the pipe on a straight line or bevelled in either direction.

A further object of the invention is to provide adjustable means to mount the apparatus upon pipes of different diameters.

Other objects and advantages of the invention will be apparent during the course of the following description.

In the accompanying drawings forming a part of this application and in which like numerals are employed to designate like parts throughout same, Figure 15 is a transverse vertical section taken on line 15—15 of Figure 2, showing the rack sections in the starting positions, Figure 16 is a side elevation of the rear rack section, removed, Figure 17 is a view similar to Figure 15, showing the front rack section shifted to the position to be coupled to the rear rack section which is now being held in the starting position, and, Figure 18 is a view similar to Figure 15, showing the coupled front and rear rack sections shifted to the end of their counterclockwise movement.

Figure 1:
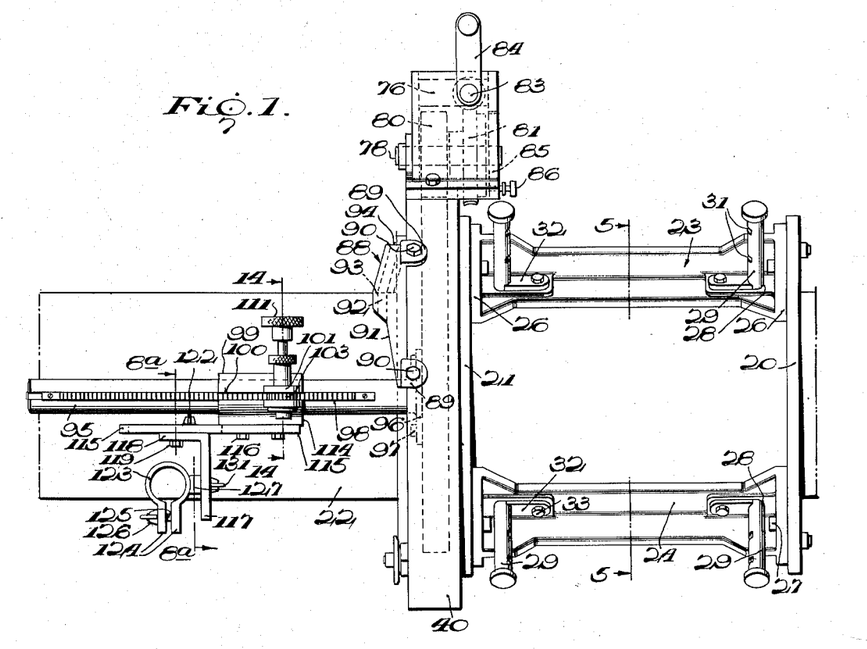
Figure 1 is a plan view of pipe cutting apparatus embodying my invention.
Figure 2:
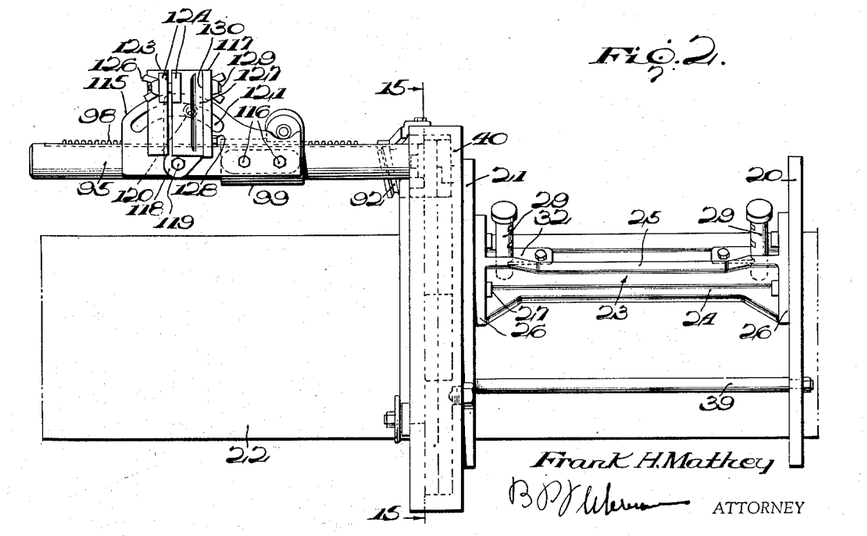
Figure 2 is a side elevation of the same.

As more clearly shown in Figures 1 and 2, the pipe cutting apparatus includes a saddle to be mounted upon the pipe. This saddle includes heads 20 and 21 which are substantially inverted U-shaped so that they may be applied over the pipe 22, to be cut. The heads 20 and 21 are rigidly secured to connecting elements or spacers 23. Each of these connecting elements or spacers are inverted T-shaped in cross-section and include a circumferential base web 24 and a radial web 25. At their opposite ends, webs 24 and 25 are formed integral with heads 26, secured to the heads 20 and 21 by bolts 27, tapped into the heads 20 and 21, Figure 5. The connecting elements or spacers 23 are arranged above the center of the openings of the heads 20 and 21 and upon opposite sides of such openings.

The base webs 24 are provided with radial openings 28 to receive radially adjustable plungers or legs 29, the inner ends of which project inwardly beyond the base webs 24, to contact with the pipe 22 and support the saddle upon the pipe in concentric relation. Each plunger or leg is provided near its inner end with a transverse pin 30, to limit the outward radial movement of the plunger 29. Each plunger is provided with longitudinally spaced notches 31, to receive a latch 32, pivoted to the base web 24, by means of a bolt 33. In view of the foregoing description, it is obvious that the plungers or legs 29 may be radially adjusted to project different distances beyond the inner faces of the base webs 24 so that these plungers will properly support the saddle upon pipes 22 of different diameters.

Figure 5:
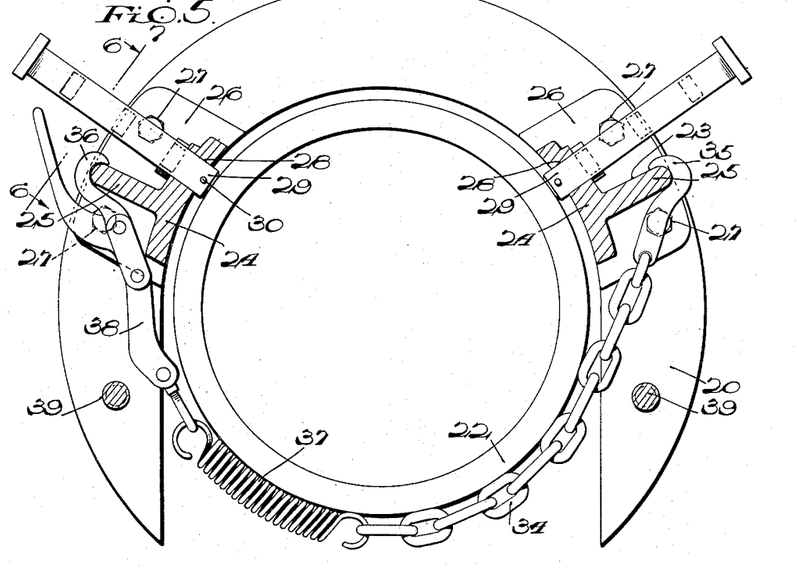
Figure 5 is a transverse vertical section taken on line 5—5 of Figure 1.
Figure 6:
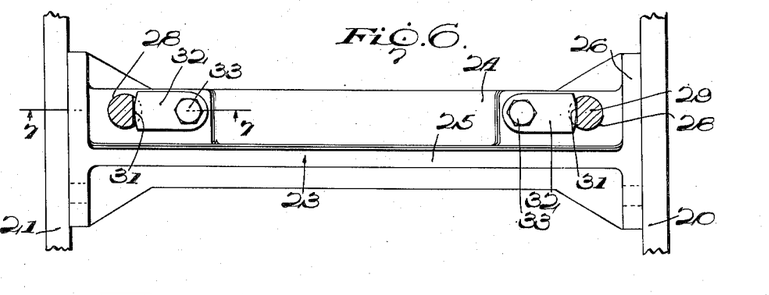
Figure 6 is a plan view of one of the connecting elements or spacers.
Figure 7:
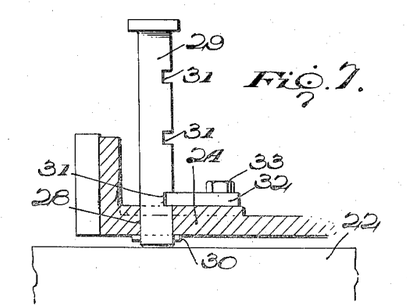
Figure 7 is a vertical section taken on line 7—7 of Figure 6.

Any suitable means may be employed to hold the saddle down upon the pipe. In Figure 5, I have shown a flexible element or chain 34, having a hook 35 at one end to engage over one radial web 23 and a hook 36 at its opposite end to engage over the other web 25. This chain has a retractile coil spring 37 and a longitudinally adjustable connecting element 38 connected therewith and between it and the hook 36. It is obvious that the hooks 35 and 36 may be applied to the longitudinal centers of the radial webs 25, subsequently to which the connecting element 38 is adjusted to place the spring 37 under tension so that the chain and the associated elements will yieldingly clamp the plungers or legs 29 against the pipe 22. Other means may be employed to engage the radial webs 25 and pass beneath the pipe to hold the plungers 29 in place upon the pipe.

The heads 20 and 21 are also rigidly connected near their lower ends by rods 39.

Figures 3, 4:
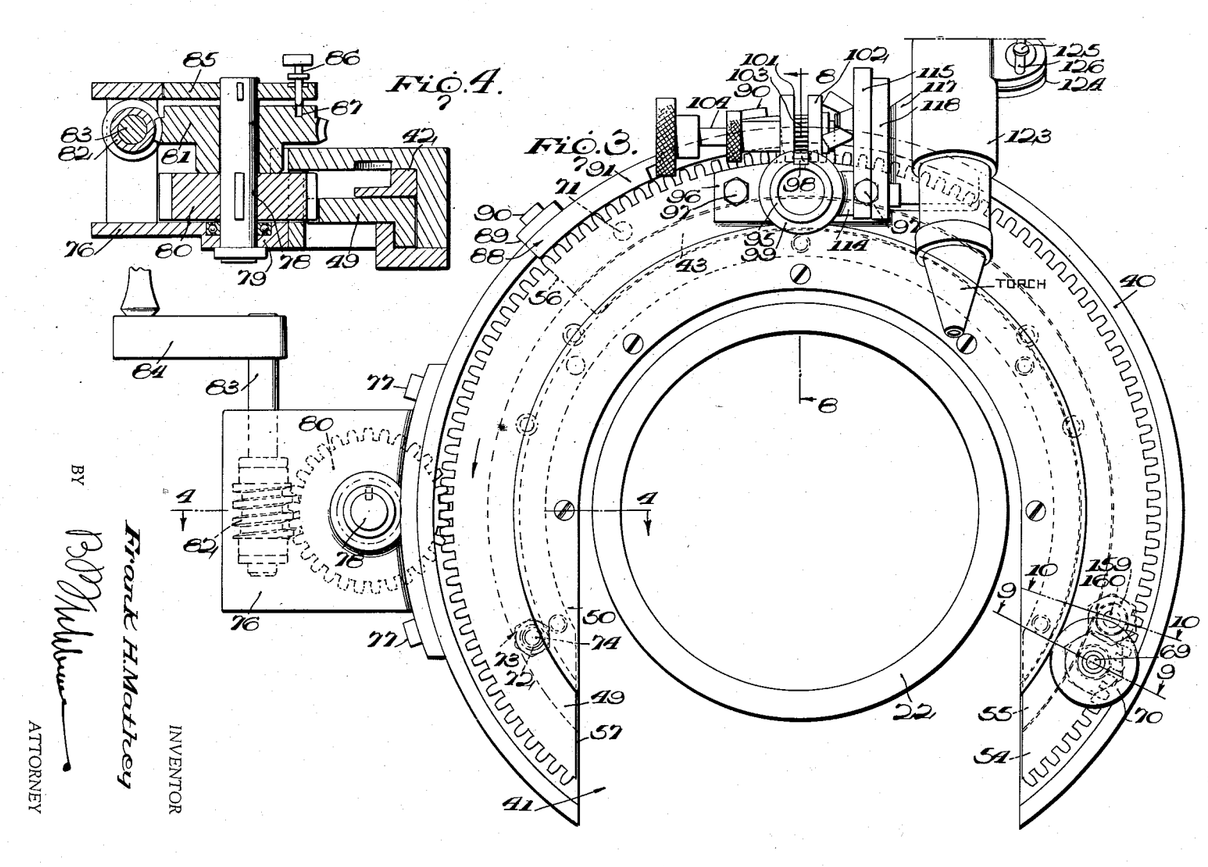
Figure 3 is a front end elevation of the apparatus.
Figure 4 is a horizontal section taken on line 4—4 of Figure 3.
Figures 15, 16, 17, 18:
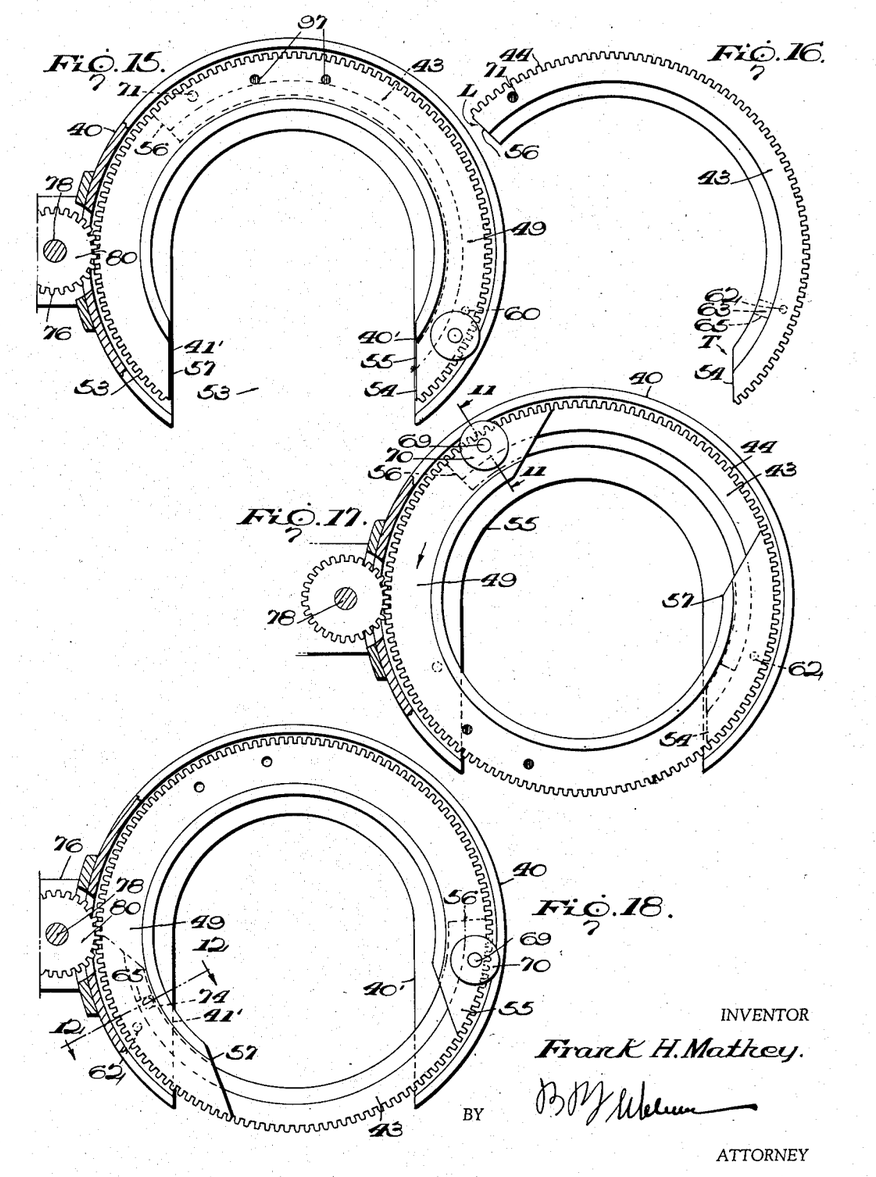

The numeral 40, Figures 1, 2 and 3, designates an inverted U-shaped housing, similar in shape to the heads 20 and 21 and having ends 40' and 41', Figure 15. This housing 40 engages the outer face of the head 21 and is rigidly secured to this head by means of bolts or the like. The opening 41 of the housing 40, Figure 3, registers with the openings of the heads 20 and 21 so that these parts may be passed over the pipe. The housing 40 is channel-shaped in transverse cross-section, Figures 9 to 11, affording a circularly curved chamber 42, for receiving a rear rack section 43. This rear rack section is circularly curved and provided upon its periphery with rack teeth 44. The rack section 43 has a rib 45, operating within a groove 46 formed in the bottom 47 of the housing 40. The rib 45 and groove 46 are circularly curved and all parts are concentric so that the rear rack section 43 may be moved longitudinally or circumferentially within the housing 40. The rack section 43 is held in position by a keeper 48, which is rigidly secured to the bottom 47 by screws or the like. Arranged within the chamber 42 of the housing next to and forwardly of the rear rack section 43 is a front rack section 49, slideably mounted upon rack section 43 and keeper 48 and held in place by keeper 50 secured to the housing 40 by screws or the like. This keeper has a recess 51 to receive a flange 52 formed upon the rack section 49. The flange 52 and recess 51 are concentric with the chamber 42 and the rack section 49 is concentric with this chamber so that the rack section 49 may turn circumferentially therein. At its outer edge the rack section 49 has rack teeth 53, adapted to register with rack teeth 44. The front rack section 49 is U-shaped, Figure 15, and is circumferentially longer than the rack section 43 and has a main opening 53, for the passage of the pipe. In the starting position, Figure 15, the trailing end 54 of the rear rack section 43 registers with the trailing end 55 of the rack section 49 while the leading end 56 of the rack section 43 terminates circumferentially rearwardly of the leading end 57 of the rack section 49, Figure 15, the term leading end being chosen with respect to counterclockwise turning movement.

Figures 8, 9, 10, 11, 12, 13, 14:
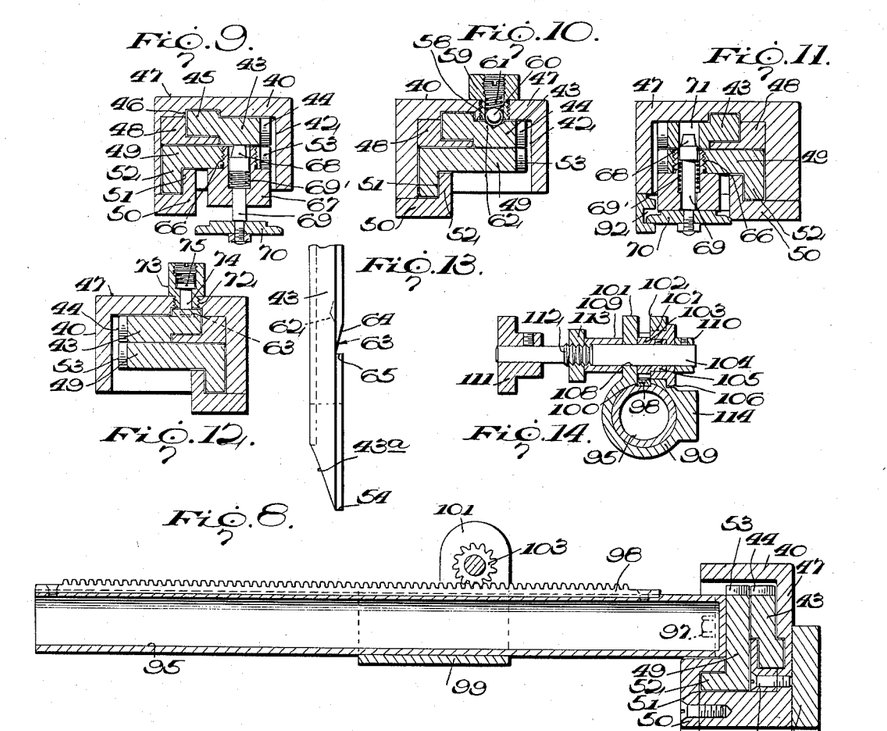
Figure 8 is a vertical section taken on line 8—8 of Figure 3.
Figure 9 is a transverse section taken on line 9—9 of Figure 3.
Figure 10 is a similar view taken on line 10—10 of Figure 3.
Figure 11 is a similar view taken on line 11—11 of Figure 17.
Figure 12 is a similar view taken on line 12—12 of Figure 18.
Figure 13 is an edge elevation of one end of the rear rack section.
Figure 14 is a transverse section taken on line 14—14 of Figure 1.
Figure 8A:
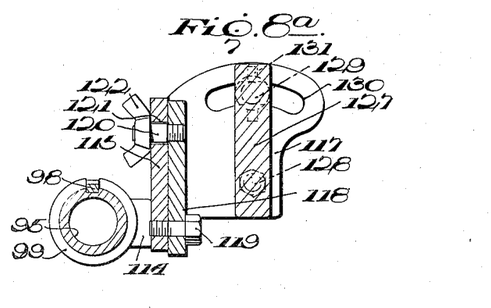
Figure 8a is a transverse vertical section taken on line 8a—8a of Figure 1.

Near the trailing end 55, the housing 40 is provided in its bottom or back with a screw-threaded opening 58, Figure 10, to receive the reduced screw-threaded end of a cage 59, holding a ball-latch 60, urged forwardly by a compressible coil spirng 61. This ball-latch can project forwardly beyond the cage 59 but cannot leave the cage and and when projected forwardly it enters a recess 62 formed in the rack section 43 near its trailing end 54, Figures 10 and 13. When the rack section 43 is in the starting position with its trailing end 54 at the adjacent end 40' of the housing 40, then the ball-latch 60 is spring pressed within the recess 62 of the rack section 43, and this rack section held against improper circumferentially shifting movement.

The rack section 43 is provided near its trailing end 54, Figure 13, and upon its rear face with a recess 63, having an inclined bottom 64 and a stop shoulder 65, at right angles to the rear face of the rack section 43. The recess 65 is arranged between the recess 62 and the trailing end 54. The end of the rack section 43 has a bevelled face 43a.

The rack section 49 is provided near its trailing end and rearwardly of the ball-latch 60 with a screw-threaded opening 66, Figures 9, 10 and 11, receiving the reduced screw-threaded end of a cage 67, having a chamber to receive a tapered reciprocatory pin 68, carried by a stem 69. This pin 68 is projected rearwardly or outwardly by a compressible coil spring 69'. At its forward end, the stem 69 has a disc 70 rigidly secured thereto. The tapered pin 68 has its rear end flat or blunt and is adapted to ride upon the front face of the rack section 43, until the pin 68 is brought over the opening 71 formed in the rear rack section 43 near its leading end 56. When this occurs, the pin 68 is projected rearwardly by the spring 69' and enters the opening 71 of the rear rack section 43 and the forward rack section 49 will be locked or coupled to the rear rack section 43 to move counterclockwise as a unit.

The housing 40 is provided in its back 47 near its left end, Figures 18 and 12, with a screw-threaded opening 72 to receive the reduced screw-threaded end of a cake 73, receiving a reciprocatory stop pin 74, urged forwardly by a spring 75. The pin 74 is arranged to enter the recess 63 when this recess is brought opposite to the stop pin 74.

The numeral 76, Figures 3 and 4, designates a gear housing, mounted upon the left side of the rack housing 40, Figure 3, and spaced from the leading end 57 of the rack 49 and the leading end 56 of the rack 43, when these racks are in the starting position, Figure 3. The housing or support 76 is secured to the periphery of the housing 40 by bolts 77. The housing or support 76 suitably holds a horizontal rotatable shaft 78, carried by a bearing 79. A gear 80 is rigidly mounted upon the horizontal shaft 78 to rotate therewith and this gear is arranged to engage with the teeth of both rack sections 43 and 49, in proper order, since the gear 80 is as wide as the combined width of the rack sections 43 and 49, Figure 4.

It might be stated that when the elements are in the adjusted position shown in Figure 3, the gear 80 is engaging the rack teeth 53 of the front rack section 49 while such gear is spaced from the leading end 56 of the rear rack section 43. A worm-wheel 81 is rotatable upon the horizontal shaft and is engaged and driven by a worm 82, carried by a vertical shaft 83, suitably mounted upon the housing 76. The vertical shaft 83 is turned by means of a hand crank 84. Means is provided to lock and unlock the worm-wheel 81 with respect to the shaft 78 including a disc 85 rigidly mounted upon the horizontal shaft 78 and this disc carries a reciprocatory bolt 86, to be moved into and out of a recess 87 formed in the worm-wheel 81. When the bolt 86 is projected into the recess 87, the shaft 78 is locked to the worm-wheel to rotate it, but when the bolt 86 is removed from the recess 87, the shaft 78 is free to turn with respect to the worm-wheel 81.

The numeral 88, Figures 1, 2 and 3, designates a cam having knuckles 89 which are arranged upon the periphery of the housing 40 and secured thereto by bolts 90. The cam 88 is provided with an inclined portion 91 leading to a groove 92 adapted to receive the periphery of the disc 70. The groove 92 is inclined and has a high part 93 and a low part 94. The disc 70 is projected rearwardly by the spring 69', as explained, and the end of the pin 68 rides upon the front face of the rack section 43. When the rack section 49 is turned counter-clockwise, Figures 3, 5 and 17, the disc 70 will engage the cam 88 and when the disc enters the groove 92 at the high part 93 the pin 68 is shifted rearwardly or retracted and is spaced from the rear rack section 43. As the disc travels toward the lower part 94 of the groove, the pin 68 moving toward the rear rack section 43, and when the disc reaches the lower part 94 the pin 68 is opposite the opening 71 and the action of the disc and spring 69' will cause the pin 68 to enter the opening 71, thereby locking the rear rack section 43 and front rack section 49 together for turning movement in a counter-clockwise direction. When the locked rack sections 43 and 49 are subsequently turned clockwise, Figure 3, when the disc 70 enters the groove 92 at the low part 94 and travels to the high part 93 and the disc will shift the pin 68 forwardly and this pin will be withdrawn from the opening 71, so that the front rack section 49 may again move with respect to the rear rack section 43, as will be further explained.

Means are provided to mount a torch upon the front rack section 49, and this means comprises a horizontal tube or supporting element 95 arranged at the top of the front rack section 49, and equidistantly spaced from the ends 55 and 57 of the front rack section 49. This tube has a flange 96 formed integral therewith which is secured to the face of the front rack section 49 by bolts 97. Arranged upon the top of the horizontal tube 95 is a rack 98 extending longitudinally thereof and rigidly secured to the tube. The teeth of the rack project radially beyond the tube 95, as shown. Slideably mounted upon the tube 95 to move longitudinally thereof but not to turn thereon, is a split resilient circumferentially adjustable tubular carriage 99, Figures 1, 2 and 14. This tubular carriage is provided in its top with a longitudinal slot 100, which receives the rack 98, and the split tubular carriage is provided with upstanding spaced parallel knuckles 101 and 102, formed integral therewith. Arranged between the knuckles 101 and 102 is a gear 103, arranged to engage the rack 98. This gear is rigidly mounted upon a horizontal shaft 104 and has a hub 105 which is clamped to the horizontal shaft 104. The hub 105 extends into a bushing 106 arranged within an opening 107 formed in the knuckle 102. The shaft 104 is also journaled within an opening 108 formed in the knuckle 101. The shaft extends through a sleeve 109. The shaft 104 has a ring 110 clamped at one end thereof adjacent to the bushing 106. At its opposite end, the shaft 104 has a milled knob 111 rigidly secured thereto, and the shaft is provided with a screw-threaded portion 112, carrying a milled lock nut 113, to bear against the sleeve 109. The nut 113 is adjusted to cause the carriage 99, which is split to have sufficient frictional engagement with the supporting element 95 so that the carriage will remain at the selected longitudinally adjusted position, when moved thereto. However, the carriage can be properly longitudinally adjusted by turning the knob 111, without further adjusting the nut 113. The nut 113 can be screwed up so tightly that the shaft 104 would be locked against turning movement and hence the nut would have to be unscrewed before the shaft could be turned.

The carriage 99 is provided upon one side with a flat 114, Figures 1, 2, 8a, and 14. A longitudinal vertical plate 115 is rigidly secured to the flat 114 by bolts 116. This longitudinally extending plate 115 has a bracket 117 vertically angularly adjusted thereon. The bracket 117 is disposed at a right angle to the plate 115 and has a base 118 rigidly secured thereto and this base is pivoted to the plate 115 near its bottom end, by a bolt 119. A bolt 120 is secured to the upper end of the base 118 and operates within a curved slot 121, formed in the plate 115. The bolt 120 carries a winged nut 122. It is thus seen that the bracket 117 may be swung longitudinally of the plate 115 in a plane parallel with the plate and locked in the selected adjusted position. The bracket 117 may be vertically disposed, as shown in Figure 1, or it may be inclined in either direction from the vertical. When the bracket 117 is vertical, the torch will cut the pipe 22 with a vertical edge, and when the bracket 117 is inclined the torch will cut the pipe with an inclined or bevelled edge.

The numeral 123 designates a split resilient sleeve or socket for holding the torch which projects downwardly below the sleeve to direct the flame upon the pipe 22. The split sleeve has knuckles 124, drawn together by a bolt 125, equipped with a winged nut 126. The sleeve 123 is provided upon its side with a flat 127, and this flat is pivoted near its lower end to the bracket 117 by means of a bolt 128. The flat is provided near its top with a bolt 129, operating within a curved slot 130 formed in the upper end of the bracket 117. The bolt carries a winged nut 131. It is obvious that the sleeve 123 may be swung in a vertical plane, parallel with the face of the bracket 117 and locked in a selected adjusted position by manipulation of the wing nut 131. The sleeve 123 is therefor angularly adjustable in planes at right angles to each other.

The operation of the apparatus is as follows:

The saddle is applied to the pipe 22, in the manner indicated in Figures 1, 2 and 3 and the tube or support 95 is in the starting position, above the pipe 22. The carriage is longitudinally adjustable upon the tube 95 and is held in the adjusted position and the sleeve 123 may be angularly adjusted in the direction longitudinally of the slide 19 and also transversely of this slide. The bracket 117 is adjusted upon the plate 115 so that the sleeve 123 and the torch will have the desired angle if it is desired to cut a bevel on the pipe.

In starting the cutting of the pipe, the torch is operated to cut a hole in the pipe, and the torch continues to operate, and the carriage 99 longitudinally adjusted by one hand of the operator, while he turns the crank 84 with the other hand, and the torch is moved around the pipe to sever the pipe, excluding the previously formed opening. The friction nut 113 may be adjusted so that it will hold the carriage 99 against improper or accidental movement, but will permit of the turning of the knob 111 manually when desired. The nut 113 may also be employed to positively lock the carriage against movement.

The rear rack section 43 and the front rack section 49 assume the starting position, shown in Figure 15, and the trailing end 54 of the rack section 43 is at the trailing end 55 of the rack section 49 while the leading end 56 of rack section 43 is spaced from the leading end 57 of rack section 49. The gear 8 is now engaging the teeth 53 of rack section 49. With the rack sections 43 and 49 in the starting position as shown in Figures 3 and 15, the trailing end 54 of rack section 43 is at right end of the housing 40, and rack section 43 is being held against turning movement by the ball-latch 60 spring-pressed within the recess 62, Figures 10 and 13. The crank 84 is now turned to rotate the gear 80 clockwise, Figure 3, and this gear now engages the teeth 53 of the rack section 49 and turns the rack section 49 counter-clockwise, Figure 3. While the rack section 49 is turning counter-clockwise, rack section 43 is being held stationary by the ball-latch 60. The rack section 49 continues to turn counter-clockwise while the rack section 43 is held against turning movement, until the rack sections 43 and 49 assume the relative position shown in Figure 17. When this relative position is reached the disc 70 passes into the slot 92 of the cam 88. This cam first moves the bolt 68 from the rack 43, but when the pin 68 becomes opposite the opening 71, the disc 70 passes from the low point 94 of the cam groove and the cam and spring 69' cause the pin 68 to enter the opening 71, thereby coupling or locking rack sections 43 and 49 together, for movement as a unit. Prior to the disc 70 engaging the cam 88, the free end of the pin 68 also travels upon the front face of the rack 43, being projected rearwardly by the spring 69'. The rack section 43 is now coupled adjacent to its leading end 56 with the rack section 49, adjacent to its trailing end 55, by virtue of the action of the pin 68 entering the opening 71. It is thus seen that the continued clockwise turning movement of the gear 80 will cause the coupled rack section 43 and rack section 49 to continue to turn counter-clockwise. The rack section 43 is positively coupled to the rack section 49 and the rack sections 43 and 49 turn as a unit counter-clockwise, Figures 17 and 18. The pull upon the rack section 43 overcomes the action of the ball-latch 60 which is now removed from within the recess 62 and contacts with the rear face of rack section 43, and does not prevent the movement of rack section 43 with rack section 49 after these rack sections are coupled together. The rack section 49 is turned counter-clockwise for slightly more than a complete revolution, as indicated in Figure 18. During this turning movement, the gear 80 engages with the teeth of the rack section 49 and feeds this rack section counter-clockwise, Figure 17, and the gear then engages with the teeth of the overlapping ends of the rack sections 43 and 49, and then with the teeth of the rack section 43 alone, and again with the teeth of both rack sections 43 and 49 adjacent to the leading end 57. The teeth of the rack sections 43 and 49 register. It is thus seen that the coupled rack sections 43 and 49 constitute a continuous annular rack so that the gear 80 may move the tube or support 95 completely around the pipe 22 to cause the torch to sever the pipe. When the rack section 49 has its leading end 57 shifted to the position shown in Figure 18, after the rack section 49 has made a little more than a complete revolution, the spring-pressed lock pin 74, Figures 3, 12 and 13, enters the recess 63, and will engage with the straight shoulder 65, thus limiting further counter-clockwise turning movement of the coupled rack sections 43 and 49. The gear 80 is now turned counter-clockwise, Figure 3, and the coupled rack sections 43 and 49 are turned clockwise, Figure 3. When they assume substantially the relative position shown in Figure 17, the ball-latch 60 will reenter the recess 62 and at this time the disc 70 has travelled to the high point 93 of the cam and the pin 68 has been withdrawn from the opening 71. The rack section 43 is now held by the ball-latch 60 against turning movement while the rack section 49 continues to turn clockwise until it assumes the relative position shown in Figure 15, with its trailing end 55 adjacent to the trailing end 54. The pin 68 has travelled upon the forward face of rack section 43 after leaving opening 71. The various parts are thus returned to the starting position with the support 95 and its carriage above the pipe at the center thereof, which is the starting position.

It is to be understood that the form of my invention herewith shown and described is to be taken as a preferred example of the same and that various changes in the shape, size and arrangement of parts may be resorted to without departing from the spirit of my invention or the scope of the subjoined claims.

Having thus described my invention, I claim:

1. Apparatus for cutting pipe, comprising a supporting structure to be mounted upon the pipe, a generally U-shaped housing mounted upon the supporting structure and having an opening in its side for the passage of the pipe, a curved rack section mounted within the housing to turn therein and having an opening in its side to be brought adjacent to the opening in the housing, said rack section being provided with a recess, releasable means mounted upon the housing and including a latch element and a spring engaging the latch element, the latch element being adapted to move into the recess when the recess is brought opposite the latch element for thereby detachably holding the rack section against turning movement, a second curved rack section mounted within the housing to turn therein and having an opening in its side to be brought adjacent to the opening of the housing, the second rack section being movable with relation to the first rack section when the first rack section is being held against movement, automatic means to couple the second rack section with the first rack section to cause the two rack sections to move together as a unit after the second rack section has been turned a selected distance with respect to the first rack section, a gear mounted upon the housing and arranged for engagement with the teeth of the first and second rack sections, and torch mounting means secured to one rack section.

2. Apparatus for cutting pipe, comprising a supporting structure to be mounted upon the pipe, a curved housing mounted upon the supporting structure and having an opening in its side, a curved rack section mounted to turn within the housing and having an opening in its side, a second curved rack section mounted within the housing and having an opening in its side, releasable means to hold the first rack section against turning movement in one direction, the second rack section being movable with relation to the first rack section when the first rack section is being held against movement, automatic means to couple the second rack section with the first rack section to cause the two rack sections to move together as a unit after the second rack section has been turned in one direction a selected distance to cover the opening of the first rack section and to uncouple the rack sections when the second rack section is moved in an opposite direction, means to turn the rack sections, and torch mounting means secured to one rack section.

3. Apparatus for cutting pipe, comprising a supporting structure to be mounted upon the pipe, a curved housing mounted upon the supporting structure and having an opening in its side, a curved rack section mounted within the housing and having an opening in its side, a second curved rack section mounted within the housing and having an opening in its side, releasable means to hold the first rack section against turning movement in one direction, the second rack section being movable with relation to the first rack section when the first rack section is being held against movement to assume a position to cover the opening of the first rack section, the first rack section being provided near its leading end with an opening, a latch device mounted upon the second rack section near its trailing end and adapted to enter the opening when the second rack section is in the position to cover the opening of the first rack section, means to move the latch device into and out of the opening, gear means engaging the rack sections to turn them, means to limit the turning movement of the first rack section in one direction, and torch mounting means secured to one rack section.

4. Apparatus for cutting pipe, comprising a supporting structure to be mounted upon the pipe, a curved housing mounted upon the supporting structure and having an opening in its side, a curved rack section mounted within the housing and having an opening in its side, a second curved rack section mounted within the housing and having an opening in its side, releasable means to hold the first rack section against turning movement in one direction including a spring-pressed latch element mounted upon the housing, the second rack section being movable with relation to the first rack section when the first rack section is being held against movement to assume a position to cover the opening of the first rack section, the first rack section being provided near its leading end with an opening, a latch device mounted upon the second rack section near its trailing end and adapted to enter the opening when the second rack section is in the position to cover the opening of the first rack section, means to move the latch device into and out of the opening including a cam mounted upon the housing, gear means mounted upon the housing to engage the rack sections and turn them, means to turn the gear means, a latch device mounted upon the housing to engage the trailing end of the first rack section to limit the movement of the first rack section in one direction, and torch mounting means secured to the first rack section.

5. Apparatus for cutting pipe, comprising a supporting structure to be mounted upon the pipe, a housing mounted upon the supporting structure and having opening in its side, a curved rack section mounted to turn within the housing and having an opening in its side, a second curved rack section mounted to turn within the housing and arranged axially of the first rack section and having an opening in its side, one end of the second rack section extending beyond the corresponding end of the other rack section when the opposite ends of the rack sections are arranged adjacent to each other, automatic releasable holding means for the first rack section, the second rack section being movable with relation to the first rack section when the first rack section is held against movement, gear means mounted upon the housing and positioned to originally engage only the end portion of the second rack section which extends beyond the corresponding end of the first rack section, second automatic means to couple the second rack section with the first rack section when the second rack section has been moved with relation to the first rack section to cover the opening in the first rack section for forming a continuous annular rack, and means to rotate the gear means so that it at first effects the relative movement of the second rack section and subsequently engages the first rack section to turn the same, the second automatic means then overcoming the holding action of said releasable holding means so that the first and second rack sections may turn as a unit.

6. Apparatus for cutting pipe, comprising a supporting structure to be mounted upon the pipe, a housing mounted upon the supporting structure and having an opening in its side, a curved rack section mounted to turn within the housing and having an opening in its side, a second curved rack section mounted to turn within the housing and arranged axially of the first rack section and having an opening in its side, the second rack section being longer than the first rack section so that its leading end projects beyond the leading end of the first rack section when the trailing ends of the rack sections are disposed adjacent to each other, automatic releasable holding means for the first rack section, the second rack section being movable with relation to the first rack section when the first rack section is held, gear means mounted upon the housing and positioned to originally engage the leading end portion of the second rack section which projects beyond the leading end of the first rack section, second automatic means to couple the trailing end of the second rack section with the leading end of the first rack section when the second rack section has been moved with relation to the first rack section to bring such ends in close relation, the gear means being arranged in the path of travel of both rack sections, and means to rotate the gear means, the second automatic means overcoming the holding action of said releasable holding means when the first and second rack sections move while being coupled together.

7. Apparatus for cutting pipe, comprising a supporting structure to be mounted upon the pipe, a housing mounted upon the supporting structure and having an opening in its side, a curved rack section mounted to turn within the housing and having an opening in its side and provided near its leading end with a latch receiving opening, a second curved rack section mounted to turn within the housing and arranged axially of the first rack section and having an opening in its side, the second rack section being longer than the first rack section so that its leading end projects beyond the leading end of the first rack section when the trailing ends of the rack sections are disposed adjacent to each other, means for controlling the turning movement of the first rack section, the second rack section being movable with relation to the first rack section, a latch device mounted upon the second rack section near its trailing end and adapted for movement into the latch receiving opening near the leading end of the first rack section when brought over such opening, cam means engaging the latch device to automatically shift the same into and out of the latch receiving opening, gear means arranged in the path of travel of both rack sections and mounted upon the housing and originally engaging only the leading end portion of the second rack section, means to rotate the gear means, and torch mounting means secured to one rack section.

8. Apparatus for cutting pipe, comprising a supporting structure to be mounted upon the pipe, a housing mounted upon the supporting structure and having an opening in its side, a curved rack section mounted to turn within the housing and having an opening in its side and provided near its leading end with a latch receiving opening and having its trailing end beveled, a second curved rack section mounted to turn within the housing and arranged axially of the first rack section and having an opening in its side, the second rack section being longer than the first rack section so that its leading end projects beyond the leading end of the first rack section when the trailing ends of the rack sections are disposed adjacent to each other, means for controlling the turning movement of the first rack section, the second rack section being movable with relation to the first rack section, a latch device mounted upon the second rack section near its trailing end and including a spring pressed latch element to enter the latch receiving opening when brought over the same, the latch element slidably engaging the face of the first rack section, a cam device mounted upon the housing to move the latch element into and out of the latch receiving opening, gear means arranged in the path of travel of both rack sections and mounted upon the housing and originally engaging only the leading end portion of the second rack section, means to rotate the gear means, and torch mounting means secured to one rack section.

9. Apparatus for cutting pipe comprising a supporting structure to be mounted upon the pipe, guide means mounted upon the supporting structure, first and second curved rack sections engaging the guide means for relative movement longitudinally thereof, automatic releasable holding means connected with the first rack section to hold the same against longitudinal movement in one direction, the second rack section being movable longitudinally of the first rack section when the first rack section is held against movement, second automatic means to couple the first and second rack sections together as a movable unit after the second rack section travels a selected distance relation to the first rack section, said second automatic means automatically overcoming the holding action of the releasable holding means when the coupled rack sections are moved as a unit, a gear arranged to engage the teeth of the first and second rack sections, and torch mounting means carried by one of said rack sections.

10. Apparatus for cutting pipe comprising a supporting structure to be mounted upon the pipe, guide means secured to the supporting structure and partially encircling the pipe, curved rack sections engaging the guide means for relative longitudinal movement around the pipe, one rack section being movable relative to the other rack section until the rack sections form a continuous ring about the pipe, automatic cam means operated by the movement of said one rack section to couple the rack sections together while arranged to form the continuous ring and to uncouple the rack sections when said one rack section is moved in the opposite direction, a gear arranged to engage the teeth of the rack sections, and means to turn the gear.

11. Apparatus for cutting pipe comprising a supporting structure to be mounted upon the pipe, guide means secured to the supporting structure and partially encircling the pipe, curved rack sections engaging the guide means for relative movement longitudinally thereof, one rack section being movable relative to the other rack section until the rack sections form a continuous ring surrounding the pipe, automatic releasable means to hold one rack section against movement until the other rack section reaches the position forming the continuous ring, second automatic means to couple the rack sections together while they are arranged to form the continuous ring, a gear arranged to engage the teeth of the rack sections, and means to rotate the gear, the second automatic means overcoming the holding action of said releasable means when the continuous ring is caused to turn.

12. Apparatus for cutting pipe comprising a supporting structure to be mounted upon the pipe, curved guide means carried by the supporting structure and partially encircling the pipe, first and second curved rack sections engaging the guide means and being relatively movable longitudinally of the guide means, means to move the first rack section longitudinally of the second rack section until the first and second rack sections form a continuous ring about the pipe, automatic means actuated by the movement of the first rack section to couple the first and second rack sections when they reach their relative positions forming the continuous ring and to uncouple the rack sections when the first rack section is moved in an opposite direction, and torch mounting means carried by one of said rack sections.

13. Apparatus for cutting pipe comprising supporting means mounted upon the pipe and including a guide partially surrounding the pipe, a carrier engaging the guide and movable longitudinally thereof to travel around the pipe, means to move the carrier, a rack bar secured to the carrier and extending longitudinally of the pipe, a split resilient tubular carriage mounted upon the rack bar for movement longitudinally thereof and having spaced substantially radial apertured knuckles, the teeth of the rack bar extending between the knuckles, a shaft journalled upon the apertured knuckles for rotation and extending transversely of the rack bar, a stop element secured to the shaft and engaging one knuckle, a nut having screw threaded engagement with the shaft and bearing against the other knuckle so that the knuckles may be drawn together to adjust the frictional engagement of the split tubular carriage and rack bar, a gear secured to the shaft for rotation therewith and disposed between the knuckles and engaging the teeth of the rack bar, and torch mounting means secured to the carriage.

FRANK H. MATHEY.

(References on following page)

REFERENCES CITED

The following references are of record in the file of this patent:

UNITED STATES PATENTS

| Number | Name | Date |
|---|---|---|
| 323,351 | McManus | July 28, 1885 |
| 1,076,797 | Sutton | Oct. 28, 1913 |
| 1,705,923 | Irvin et al. | Mar. 19, 1929 |
| 1,826,164 | Carrier et al. | Oct. 6, 1931 |
| 1,860,653 | Brown | May 31, 1932 |
| 1,879,346 | Lawrence | Sept. 27, 1932 |
| 1,886,855 | Wagner | Nov. 8, 1932 |
| 2,086,764 | Brown | July 13, 1937 |
| 2,146,959 | Kugel | Feb. 14, 1939 |
| 2,242,448 | Bucknam et al. | May 20, 1941 |
| 2,283,345 | Young | May 19, 1942 |
| 2,295,182 | Norton | Sept. 8, 1942 |
| 2,408,517 | Howard | Oct. 1, 1946 |
| 2,509,698 | Rudisell | May 30, 1950 |